June 14, 1927.

H. H. ROSS

CARD GAME

Filed Jan. 20, 1926

1,632,681

Inventor

Harry H. Ross.

By *[signature]*
Attorney

Patented June 14, 1927.

1,632,681

UNITED STATES PATENT OFFICE.

HARRY H. ROSS, OF TOLEDO, OHIO.

CARD GAME.

Application filed January 20, 1926. Serial No. 82,566.

My invention has for its object to provide a card game that is based upon principles of phonetics and correct pronunciation of words. It has for its object to provide a means whereby the success of the individuals playing the game will be determined by his ability to pronounce correctly words that are used in the game. Thus the result of my invention is dissemination of knowledge of the correct pronunciation of words of the language chosen.

The words may be in any language and any number of words may be used, and consequently the number of cards used in the game may be greatly varied.

The details of the subject matter, that is, the words, symbols and indicia, may be greatly varied and the rules of the game may be altered without departing from the spirit of the invention. To set forth a practical application of the invention I shall describe a game that involves my invention as an example of games that may utilize the spirit of the invention. To aid in the description, I have shown in the figures cards that may be used in the particular game referred to.

Figure 1:
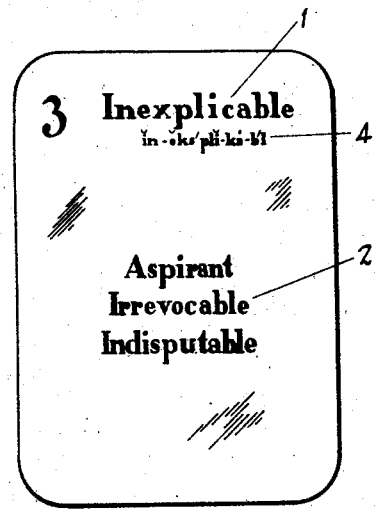
Figure 2:
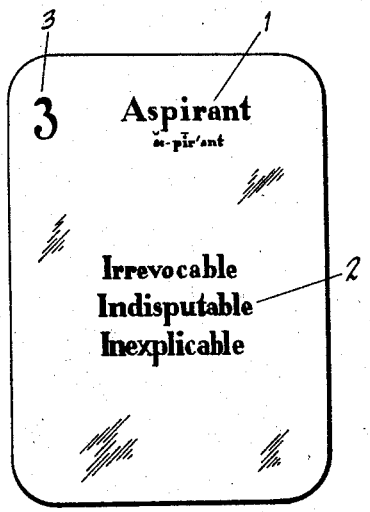
Figure 3:
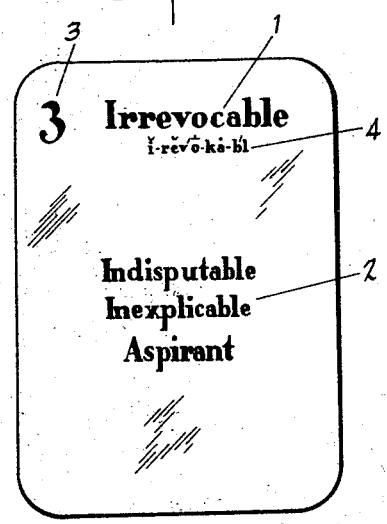
Figure 4:
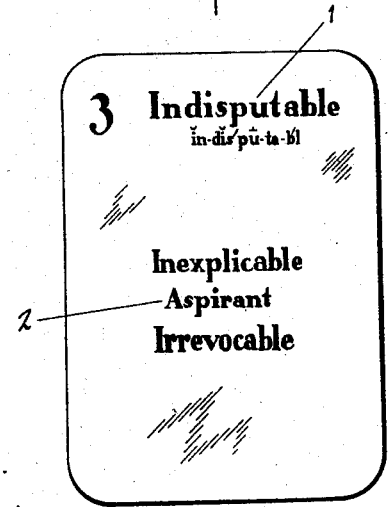

Figure 1 illustrates a card of a group. Fig. 2 illustrates a card of the same group. Figs. 3 and 4 illustrate other cards of the same group to which the cards of Figs. 1 and 2 belong.

There are as many cards in the game as there are words used in playing the game. Each card may be designated by one of the words and the card may therefore be characterized or designated by the word. The characteristic word is printed prominently upon the face of the card and preferably at the top of the card as at 1, and the other words of the group to which the card belongs, are printed on the face of the card and preferably below the characteristic word, such as at 2. When, therefore, there are three words in any one group there will be three words printed on the card, the characteristic word of the card being printed at the top and the other two words being printed below and preferably in spaced relation to the characteristic word on each card of the group. The same is true when there are five or six cards of the group, the characteristic word of each card of the group being printed, preferably, at the top of the card in a prominent manner and the other four or five words being printed in a noticeably separated position on the face of the card. The number of words on each card will therefore, determine the number in the particular group to which the card relates and will indicate the same to the holder of the card. The words selected for each group may have if desired some definite relation to each other as for example, the words of any particular group may be words having a certain suffix or prefix or they may be accented in a particular way or they may be French or Latin words commonly used in conversing in the English language, etc. Thus the number of cards in each group may be varied to include all or as many as possible of such related words, or such related words may be contained in two or more groups. I find it preferable, however, to divide the cards into groups, each group having the same number of cards and making the rule that the success of the players shall be determined by the number of groups that they may be able to secure in playing the game, which will be roughly proportional to the number of words that the player is able to correctly pronounce.

The groups, which are termed books, in playing the game, are preferably numbered for ready reference by a number that is printed on the face of the card, such as at 3. Any number of players may play the game provided there is a sufficient number of cards used in making up any particular card game. The rules of the game may be greatly varied as to the distribution of the cards and counts, etc. The underlying rule of the game is that the players may call for cards in the possession of other players and which belong to the same group that he holds in his hand. In making his call for the card, however, the characteristic word must be correctly pronounced. The correct pronunciation of the characteristic word only is indicated on each card. This may be done by phonetically printing the characteristic word together with the phonetic symbols and accents at a point in close proximity to the characteristic word, such as at 4, while the other words of the card, that is, the other characteristic words of the group printed on each card do not have the indications for pronunciation and the one calling for the card does not have this aid to correctly pronounce the characteristic word on the card called for which determines his right to the card. There is thus involved in the game not only the problems of deduction as to which of the players has or have certain cards, but also the complication of correct pronunciation adds a greater zest to the game.

I claim:

1. In a game, a plurality of cards divided into groups, each card of a group having a word characteristic of the card printed thereon, and characteristic words of the other cards of the group printed thereon in distinctive relation to the characteristic word of the card and pronunciation symbols of the characteristic word of the card only, of all the words on the card, printed in indicative relation to the characteristic word of the card.

2. In a game, a plurality of cards divided into groups, each card of a group having a word characteristic of the card printed thereon, and characteristic words of the cards of the group printed thereon in distinctive relation to the characteristic word of the card and pronunciation symbols and phonetic spelling of the characteristic word of the card only, of all the words on the card, printed in indicative relation to the characteristic word of the card.

In testimony whereof I have hereunto signed my name to this specification.

HARRY H. ROSS.